United States Patent
Hahn et al.

[15] 3,642,455
[45] Feb. 15, 1972

[54] PROCESS FOR RECOVERING LOW-SULFATE BISCHOFITE

[72] Inventors: Burkhard J. Hahn, Ronnenberg; Rolf M. E. Reise; Walter R. Raschka, both of Bad Salzdetfurth, all of Germany

[73] Assignee: Salzdetfurth A.G., Hannover, Germany

[22] Filed: Apr. 12, 1968

[21] Appl. No.: 720,959

[52] U.S. Cl. .................................................23/304, 23/91
[51] Int. Cl. .............................................................C01f 5/30
[58] Field of Search................23/304, 128, 67, 91, 296, 298, 23/297

[56] References Cited

UNITED STATES PATENTS

| | | | |
|---|---|---|---|
| 2,479,001 | 8/1949 | Burke et al. | 23/298 |
| 2,758,912 | 8/1956 | Dancy | 23/91 |
| 2,759,794 | 8/1956 | Fuchsman | 23/91 |
| 2,895,794 | 7/1959 | Dancy | 23/128 |
| 3,101,247 | 8/1963 | Serowy | 23/128 |
| 3,499,725 | 3/1970 | Scarfi et al. | 23/128 |
| 3,342,548 | 9/1967 | Macey | 23/91 |

OTHER PUBLICATIONS

Vol. 4, Inorganic and Theoretical Chemistry, Mellor, pp. 322-324, 1923

Primary Examiner—Norman Yudkoff
Assistant Examiner—S. Silverberg
Attorney—David V. Trask

[57] ABSTRACT

Aqueous brines containing both magnesium chloride and magnesium sulfate are treated to recover a low-sulfate bischofite ($MgCl_2 \cdot 6H_2O$). The brines are subjected to evaporation, as required, to produce a brine which is substantially supersaturated with respect to magnesium sulfate. The evaporation is conducted at high temperatures to avoid crystallization of magnesium chloride. The supersaturated magnesium sulfate brine is then held at high temperature under conditions which maintain the magnesium chloride in solution for a sufficiently long duration to permit the crystallization of magnesium sulfate as $MgSO_4 \cdot 5/4\ H_2O$. Clarified brine recovered from the resulting sulfate-crystal slurry is subjected to evaporation under vacuum and at low temperature, preferably below about 90° C., at sufficient rate to produce a low-sulfate bischofite crystal crop.

14 Claims, 1 Drawing Figure 3,642,455
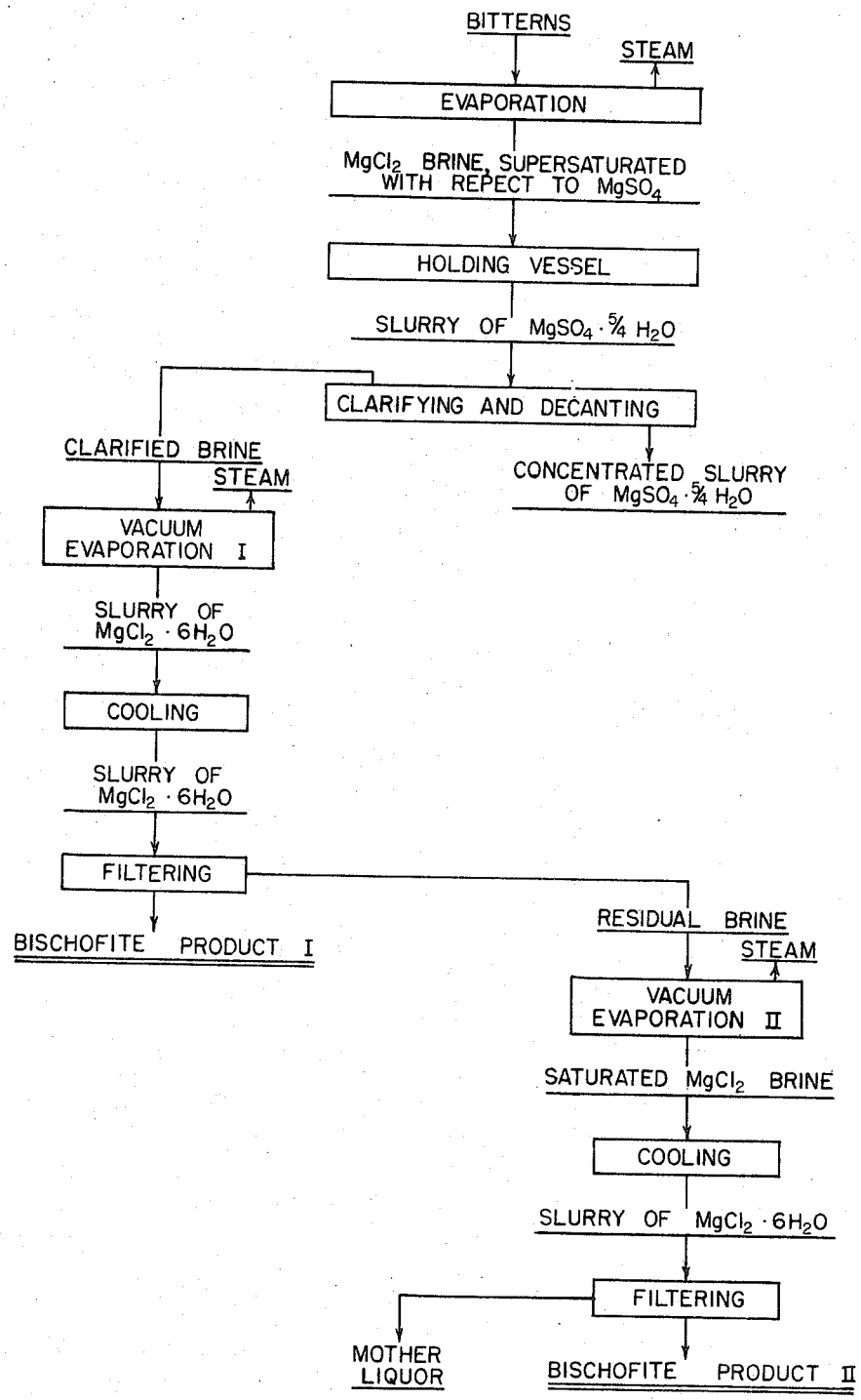
INVENTORS
BURKHARD J. HAHN
ROLF M. E. REISE
WALTER R. RASCHKA
BY Mallinckrodt and Mallinckrodt
ATTORNEYS

PROCESS FOR RECOVERING LOW-SULFATE BISCHOFITE

BACKGROUND OF THE INVENTION

Field:

This invention relates to the production of magnesium chloride from brine. Specifically, it provides a method for producing low-sulfate bischofite from brines supersaturated with respect to magnesium sulfate.

State of the Art:

It is known to evaporate brines which contain both magnesium chloride and magnesium sulfate, such as bitterns, to obtain a bischofite product. Such products normally contain high levels of sulfate impurities. The production of low-sulfate bischofite from brine containing even small amounts of sulfate impurities has involved complicated techniques.

Heretofore, low-sulfate bischofite products have been obtained from such brines by chemically treating the brine. Thus, for example, brines have been treated with calcium chloride and barium chloride to remove sulfate prior to subjecting the brines to evaporation. An alternate procedure involves removing sulfate by first evaporating to crystallize artificial kieserite ($MgSO_4 \cdot 5/4H_2O$) and then treating the hot $MgCl_2$ solution with calcium chloride and barium chloride to remove the residual sulfate. Other procedures for removing sulfate from brines include ion exchange and solvent extraction techniques. Each of these known techniques for removing sulfate from brines involves the use of reagents and requires special treating procedures. Thus, there has been a need for a physical process for producing low-sulfate bischofite from sulfate-containing brines, which requires no special chemical reagents.

SUMMARY OF THE INVENTION

This invention provides a simple, straightforward process whereby brines containing both magnesium chloride and magnesium sulfate are manipulated with respect to temperature and residence time to produce a low-sulfate bischofite crystal product. Rather than relying on chemical methods of removing sulfate, the bischofite is actually crystallized from a brine which is supersaturated with respect to magnesium sulfate. The crystallization is conducted under carefully controlled conditions which inhibit the concurrent crystallization of sulfate minerals.

According to this invention, magnesium chloride brines containing sulfate impurity in either minor or major amounts are evaporated to concentrate the solution with respect to magnesium chloride. The evaporation is done at high temperature to obtain a solution as concentrated with respect to magnesium chloride as is practical. Brines which contain substantial quantities of sulfate, when treated in this fashion, become substantially supersaturated with respect to magnesium sulfate before the solubility limit of magnesium chloride is exceeded. If a starting brine should contain considerably more magnesium chloride than magnesium sulfate, it is sometimes preferable to first recover magnesium chloride from the brine by evaporation and cooling techniques under conditions which retain most of the sulfate in solution. Ultimately, however, the brines become sufficiently concentrated in sulfate that additional magnesium chloride crystallized therefrom contains unacceptable amounts of sulfate impurity. The brines are then conveniently evaporated at high temperatures until they are supersaturated with respect to magnesium sulfate and concentrated with respect to magnesium chloride. Such brines, i.e., magnesium chloride brines supersaturated with respect to magnesium sulfate, are treated in accordance with the present invention to recover bischoffite low in sulfate impurities, e.g., bischofite containing less than about 0.1 percent by weight sulfate.

In the practice of this invention, a magnesium chloride brine is held at a temperature sufficiently high to promote the crystallization of $MgSO_4 \cdot 5/4\ H_2O$ until the concentration of magnesium sulfate in solution is substantially reduced. During this holding procedure, the temperature and water content of the brine are maintained sufficiently high to avoid the crystallization of magnesium chloride. Generally it is preferred to operate under nonconcentrating conditions, i.e., under conditions in which the brine loses essentially none of its water. Nonconcentrating conditions may be maintained by refluxing, if boiling temperatures are employed. Alternatively, the brine may be held, in either an open or pressurized vessel, at a temperature near but below its actual boiling point at the pressure maintained in the vessel to avoid the discharge of vapors to the atmosphere. In any event, the brine should be held for an appropriate residence time at a temperature at least near its normal boiling point, typically above about 120° C., to promote the crystallization of $MgSO_4 \cdot 5/4H_2O$. The rate of crystallization of $MgSO_4 \cdot 5/4H_2O$ is higher at higher brine temperatures. Thus, it is often preferred to hold the brine under elevated temperature and pressure conditions. If the brine is relatively unconcentrated with respect to magnesium chloride when it is introduced to this holding procedure, it is sometimes useful to permit evaporation until the brine becomes concentrated with respect to magnesium chloride.

In general, the longer the brine is held at elevated temperature, the more complete will be the crystallization of $MgSO_4 \cdot 5/4H_2O$ therefrom. As a practical matter, it is rarely economically justifiable to hold the brine for the full residence time required to complete the crystallization. It has been found, however, that completion of the crystallization is unnecessary. Good bischofite crystal product is obtainable by cooling concentrated magnesium chloride brines which are still supersaturated with magnesium sulfate. For purposes of this invention, it is normally sufficient to retain the brine at high temperature until the concentration of $MgSO_4$ in the brine is less than about 20 grams per liter. Further reduction of $MgSO_4$ concentration is desirable. Thus, retention times resulting in $MgSO_4$ concentrations of less than about 16 grams per liter are preferred. Under reflux boiling at ambient pressure, residence times of about 1 to about 5 hours have been adequate for sulfate removal from the brine. Residence times of less than about ½ hour are seldom satisfactory.

The residual magnesium chloride brine is separated from the $MgSO_4 \cdot 5/4\ H_2O$ crystals by any suitable technique. Because these crystals are very fine in size, clarification and decantation are usually most convenient. The temperature of clarification should be sufficiently high to retain the magnesium chloride in solution.

The hot-clarified magnesium chloride brine may be treated in a variety of ways to produce acceptable bischofite crystal crops. Various combinations of cooling and evaporation may be employed to obtain low-sulfate bischofite product from brine which is still supersaturated with respect to magnesium sulfate. To produce a good product, however, it is necessary to conduct the crystallization at a temperature sufficiently low and at a rate sufficiently high to avoid concurrent crystallization of magnesium sulfate. Generally, when evaporation is relied upon, it should be conducted under vacuum at a temperature lower than about 90° C., preferably below about 80° C., and rarely above 100° C. Evaporation may be continued until the solubility limit of magnesium chloride in the brine is exceeded or it may be discontinued prior to the formation of a crystal crop. It is sometimes advantageous to first evaporate under vacuum to obtain in a saturated $MgCl_2$ brine, which may contain crystallized bischofite, and then cool the brine to obtain a crystal crop. The depleted brine is then again subjected to vacuum evaporation, preferably at lower temperatures, and is again cooled to obtain a second crystal crop. In this fashion, bischofite recovery is accomplished at reduced average temperatures and at higher rates, thereby discouraging the concurrent crystallization of magnesium sulfate minerals.

Recovery of the bischofite ($MgCl_2 \cdot 6H_2O$) from the residual brine may be effected by any convenient physical separation procedure. Filtration is normally convenient, for example.

DESCRIPTION OF THE DRAWING

The single FIGURE of the drawing is a flowsheet representing what is presently contemplated as the best mode of practicing the invention.

DESCRIPTION OF THE ILLUSTRATED EMBODIMENT

The invention will be better understood by reference to the following examples and the drawing.

EXAMPLE I

Referring to the drawing, bitterns were evaporated under vacuum (500–580 mm. Hg) to maintain a temperature of evaporation of 90° C. until the brine was supersaturated with magnesium sulfate. The brine was then reflux boiled in a holding vessel for 2 hours at 128° C. and normal atmospheric pressure thereby producing a slurry of $MgSO_4 \cdot 5/4H_2O$. The $MgSO_4 \cdot 5/4H_2O$ slurry was then hot-clarified at 110° C., and the brine was recovered by decantation. Eighty percent of the $MgSO_4$ in the bitterns was removed in this fashion. The clarified $MgCl_2$ solution was evaporated in two stages, under vacuum, at 85° C. and 74° C., respectively. Low-sulfate bischofite product was recovered after each stage by cooling the brine to 25° C. and filtering. A material balance of the process is reported in Table 1.

EXAMPLE III

The bitterns composition described in Example I was vacuum evaporated at 90° C., (500–580 mm. Hg) and thereafter immediately cooled to 25° C., without first being held at high temperature. It was then filtered. Only a small amount of $MgSO_4$ could be removed as solid $MgSO_4 \cdot 5/4H_2O$. The filtrate contained 51 g./l. $MgSO_4$, compared to 20 g./l. $MgSO_4$ in Example I and 9 g./l. $MgSO_4$ in Example II.

Further evaporation of the filtrate in accordance with the procedure of Example I produced products with 8.4 and 6.8 percent $MgSO_4$ compared to less than 0.01 percent $MgSO_4$ in the products produced by Examples I and II.

This example thus demonstrates the need for holding the brine at a high temperature for a sufficient time period to permit the crystallization of $MgSO_4 \cdot 5/4H_2O$.

EXAMPLE IV

The bitterns composition of Example I was vacuum evaporated to about 460 g./l. $MgCl_2$ and was then reflux boiled for different lengths of time. The brine was cooled and clarified; the clear brine was then analyzed. The results are reported in Table 3.

TABLE 1.—MATERIAL BALANCE

| | | Total | MgCl₂ | MgSO₄ | KCl | NaCl | H₂O | Percent of MgCl₂ |
|---|---|---|---|---|---|---|---|---|
| In | Bitterns* | 4,058 | 1,127 | 228 | 33 | 27 | 2,643 | 100.0 |
| Out | Evaporation: H₂O | 585 | | | | | 585 | |
| | MgSO₄·5/4H₂O slurry: | | | | | | | |
| | Salt | 250 | 19 | 176 | 2 | 1 | 52 | 1.7 |
| | Brine | 555 | 188 | 8 | 1 | 2 | 356 | 16.7 |
| | Vacuum evaporation I: | | | | | | | |
| | Steam | 210 | | | | | 210 | |
| | Product I | 800 | 346 | 0 | 18 | 15 | 421 | 30.7 |
| | Vacuum evaporation II: | | | | | | | |
| | Steam | 125 | | | | | 125 | |
| | Product II | 335 | 153 | 0 | 1 | 1 | 180 | 13.6 |
| | Mother liquor | 920 | 300 | 28 | 1 | 3 | 588 | 26.6 |
| | Loss | 278 | 121 | 16 | 10 | 5 | 126 | 10.7 |
| | Total | 4,058 | 1,127 | 228 | 33 | 27 | 2,643 | 100.0 |

*Bitterns Composition: 80 moles MgCl₂, 12.5 moles MgSO₄, 1.5 moles Na₂Cl₂, 1.5 moles K₂Cl₂, 1,000 moles H₂O, specific gravity at 25° C. 1.330.

It is apparent that a similar procedure could be carried out recycling the mother liquor to the holding vessel. In that event, a purge stream is normally required to maintain acceptably low concentrations of impurities, such as lithium and boron, in the circulating liquor.

EXAMPLE II

The procedure of Example I was followed, starting with bitterns of the same composition, except that, rather than clarifying at 110° C., the entire slurry was cooled down to 25° C., and the solids were filtered off. Table 2 presents a material balance of the process:

TABLE 3

SO₄ Removal By Reflux Boiling After Vacuum Evaporation (grams per liter)

| | Feed | Time of Reflux Boiling (minutes) | | | | |
|---|---|---|---|---|---|---|
| | | 0 | 30 | 60 | 90 | 120 |
| MgCl₂ | 370 | 446 | 460 | 463 | 464 | 465 |
| MgSO₄ | 75 | 50 | 16 | 13 | 11 | 10 |
| KCl | 11 | 1.4 | 1.4 | 1.4 | 1.4 | 1.4 |
| NaCl | 9 | 4.0 | 4.2 | 4.3 | 4.0 | 3.9 |
| Density (25° C.) | 1.330 | 1.348 | 1.344 | 1.341 | 1.339 | 1.339 |

TABLE 2. MATERIAL BALANCE

| | | Total | MgCl₂ | MgSO₄ | KCl | NaCl | H₂O | Percent of MgCl₂ |
|---|---|---|---|---|---|---|---|---|
| In | Bitterns | 4,070 | 1,130 | 229 | 34 | 27 | 2,650 | 100.0 |
| Out | Evaporation: H₂O | 585 | | | | | 585 | |
| | Filtered sulfate salt: | | | | | | | |
| | Salt | 490 | 123 | 193 | 27 | 15 | 132 | 10.9 |
| | Brine | 552 | 192 | 4 | 1 | 2 | 353 | 17.0 |
| | Vacuum evaporation I: | | | | | | | |
| | Steam | 257 | | | | | 257 | |
| | Product I | 860 | 397 | 0 | 1 | 5 | 457 | 35.1 |
| | Vacuum evaporation II: | | | | | | | |
| | Steam | 210 | | | | | 210 | |
| | Product II | 360 | 165 | 0 | 1 | 1 | 193 | 14.6 |
| | Mother liquor | 640 | 218 | 10 | 1 | 2 | 409 | 19.3 |
| | Loss | 116 | 35 | 22 | 3 | 2 | 54 | 3.1 |
| | Total | 4,070 | 1,130 | 229 | 34 | 27 | 2,650 | 100.0 |

Although the invention has been described with particular reference to details of certain specific embodiments, it is not intended thereby to limit the scope of the invention, except insofar as the details are recited in the appended claims. Many modifications within the scope of the invention will be suggested to those skilled in the art by the present disclosure.

We claim:

1. The method of recovering magnesium chloride from brines containing both magnesium chloride and magnesium sulfate which comprises:
   subjecting the brine to evaporation until it is substantially supersaturated with respect to magnesium sulfate;
   holding the brine at a temperature sufficiently high to promote the crystallization of $MgSO_4 \cdot 5/4H_2O$ until the concentration of $MgSO_4$ is substantially reduced, while maintaining the temperature and water content of the brine sufficiently high to avoid the crystallization of magnesium chloride, thereby to produce a slurry of $MgSO_4 \cdot 5/4H_2O$ crystals in a concentrated magnesium chloride brine;
   separating the brine from the $MgSO_4 \cdot 5/4H_2O$ crystals while the brine is still saturated with respect to $MgSO_4$; and
   crystallizing bischofite from the said $MgSO_4$-saturated brine at sufficiently low temperature and sufficiently high rate to avoid concurrent crystallization of further magnesium sulfate.

2. The method of claim 1, wherein after the brine is supersaturated with respect to magnesium sulfate, it is held at a temperature at least near its normal boiling point.

3. The method of claim 2, wherein the brine is held at said temperature under nonconcentrating conditions.

4. The method of claim 2, wherein the brine is held at said temperature for at least about one-half hour.

5. The method of claim 1, wherein the brine separated from the $MgSO_4 \cdot 5/4H_2O$ crystals is evaporated at a temperature below about 90° C. to crystallize bischofite.

6. The method of claim 1, wherein the initial brine is evaporated at sufficiently high temperature that the solubility limit of magnesium chloride is not exceeded; the brine supersaturated with respect to magnesium sulfate is held at a temperature at least near its normal boiling point for at least about one-half hour until there is produced a residual brine containing less than about 20 grams per liter $MgSO_4$; the brine is clarified; and the clarified brine is evaporated at a temperature below about 90° C. to crystallize bischofite.

7. The method of claim 6, wherein the supersaturated brine is held at a temperature above about 120° C.

8. The method of claim 6, wherein the clarified brine is evaporated until it is saturated with respect to magnesium chloride and it is then cooled to crystallize bischofite.

9. The method of claim 8, wherein the bischofite product is recovered; the residual brine is again evaporated at a temperature below about 90° C. until it is saturated with respect to magnesium chloride and the saturated brine is again cooled to crystallize bischofite.

10. The method of recovering magnesium chloride from a magnesium chloride brine which is supersaturated with respect to magnesium sulfate which comprises:
    holding the brine in a vessel to permit the crystallization of $MgSO_4 \cdot 5/4H_2O$ while maintaining the temperature and water content of the brine sufficiently high to avoid the crystallization of magnesium chloride;
    separating the residual brine from the $MgSO_4 \cdot 5/4H_2O$ crystals while the residual brine is still saturated with respect to $MgSO_4$; and
    crystallizing bischofite from the residual brine at a temperature below about 90° C.

11. The method of claim 10, wherein the initial brine is held at temperature above about 120° C. until the concentration of $MgSO_4$ in the brine is below about 20 grams per liter.

12. A method according to claim 10, wherein the residual brine is cooled sufficiently rapidly to avoid the concurrent crystallization of magnesium sulfate.

13. A method according to claim 12, wherein the cooling is effected by vacuum evaporation.

14. A method according to claim 1, wherein the brine separated from the $MgSO_4 \cdot 5/4H_2O$ crystals is cooled to below about 90° C. to crystallize bischofite.

* * * * *